(12) United States Patent
Wabnitz

(10) Patent No.: US 7,614,176 B2
(45) Date of Patent: Nov. 10, 2009

(54) WATERFOWL DECOY ARTIFICIAL WAVES AND RIPPLES SKIRT

(76) Inventor: Steven Gregory Wabnitz, 18 Greenburg Rd., Martinsburg, WV (US) 25404

( * ) Notice: Subject to any disclaimer, the term of this patent is extended or adjusted under 35 U.S.C. 154(b) by 0 days.

(21) Appl. No.: 12/079,203

(22) Filed: Mar. 24, 2008

(65) Prior Publication Data

US 2008/0172921 A1    Jul. 24, 2008

Related U.S. Application Data

(63) Continuation of application No. 11/384,158, filed on Mar. 20, 2006, now abandoned.

(51) Int. Cl.
*A01M 31/06* (2006.01)
(52) U.S. Cl. .................................. 43/3; 43/2
(58) Field of Classification Search .............. 43/2, 43/3; D22/125
See application file for complete search history.

(56) References Cited

U.S. PATENT DOCUMENTS

| 261,910 | A |   | 8/1882  | Cochel |
|---------|---|---|---------|--------|
| 740,293 | A |   | 9/1903  | Loeble |
| 1,185,164 | A | * | 5/1916 | Batcher ........................... 43/3 |
| 2,624,144 | A |   | 1/1953 | Beverman |
| 2,822,644 | A | * | 2/1958 | Berger ............................ 47/32 |
| 4,599,819 | A |   | 7/1986 | Voges, Jr. |
| 4,607,447 | A | * | 8/1986 | Wright ............................ 43/3 |
| 6,138,396 | A |   | 10/2000 | Capps |
| 6,234,857 | B1 | * | 5/2001 | Suellentrop ................. 441/129 |
| 6,625,919 | B1 |   | 9/2003 | Davis |
| 6,634,133 | B1 | * | 10/2003 | Levandowski .................... 43/3 |

* cited by examiner

*Primary Examiner*—David J Parsley
(74) *Attorney, Agent, or Firm*—Crowell Ing, LLP; Carl D. Crowell; Nye Wang

(57) ABSTRACT

A waterfowl decoy apparatus for simulating waves and ripples of water used to attract waterfowls, wherein the apparatus comprises of a transparent flexible member, neutrally buoyant, with undulating orbital curvatures. In addition, the apparatus is adapted to be operatively connected to a waterfowl replica decoy in its deployed position.

5 Claims, 3 Drawing Sheets

WATERFOWL DECOY ARTIFICIAL WAVES AND RIPPLES SKIRT

CROSS REFERENCE TO RELATED APPLICATIONS

This is a continuation of application of Ser. No. 11/384,158, filed Mar. 20, 2006, now abandoned.

BACKGROUND OF THE INVENTION

1. Field of Invention

The invention relates generally to waterfowl decoys. Particularly, this invention pertains to decoys which simulate waves and water ripples.

2. Prior Art

Waterfowl hunting has many variables which have nothing to do with waterfowl decoys such as camouflage of hunters, waterfowl calls, and the startling movements by hunters. Once these variables are reduced to non-factors, the look of the decoy becomes paramount.

A daunting challenge in waterfowl hunting is attracting waterfowl within the gunshot range of the hunter. To attract waterfowls, a variety of decoys have been devised.

Several U.S. Patents are illustrative of prior art decoys for waterfowls. U.S. Pat. No. 261,910 issued to Cochel on 1 Aug. 1882, entitled Decoy, focuses on a decoy anchoring system. The duck decoys shown in this prior art float above the water but do not produce any rippling effects other than those caused by the wind. Thus live waterfowls flying nearby may become cautious due to the lack of water rippling around the floating decoys.

U.S. Pat. No. 740,293 issued to Loeble on 9 Sep. 1908, entitled Decoy, teaches of a decoy apparatus that simulates a duck about to take flight from a resting position in the water. This device is overly complicated and once again ignores the need to simulate a rippling effect caused by actual ducks while wallowing or moving on the surface of the water.

U.S. Pat. No. 1,185,164 issued to Batcher on 30 May 1916, entitled Decoy, attempts to simulate a water environment by using a canvass painted to represent a pond and then to put duck decoys on the canvass to represent resting ducks. Although this may work in limited situations, it is still after all a two dimensional picture. Furthermore, hunters wishing to use decoys in a real water environments would not find this canvass useful.

U.S. Pat. No. 2,624,144 issued to Beverman on 6 Jan. 1953, entitled Duck Decoy Support, teaches once again of a complicated apparatus that can move water fowl decoys in a large circle to simulate movement. Although this may simulate waves and water ripples around the decoys, it may be too time consuming and expensive to implement.

U.S. Pat. No. 4,599,819 issued to Voges on 15 Jul. 1986, entitled Decoy Dabbler, is yet another patent that tries to solve the important issue of simulating movement in duck decoys. Voges's invention teaches of a spring and anchor system that is to give the appearance of movement of the duck decoy by causing movement and ripples on the surface of the water around the decoy. Although this may be effective in fooling waterfowls, it is somewhat tedious to implement.

U.S. Pat. No. 4,607,447 issued to Wright on 26 Aug. 1986 entitled Food Decoy Mat for Waterfowl is very much like Batcher but instead of using a solid material, it uses a clear plastic material. Its main purpose is to be used in an open field to simulate ground feeding areas for waterfowls. It has an alternative use in a water environment as a decoy anchor. The material used for the decoy mat may be heavy and cumbersome depending on the size of the mat, and does not properly emphasize the rippling and wave effect of a ducks in water.

U.S. Pat. No. 6,138,396 issued to Capps entitled Waterfowl Decoy Towing System is yet another attempt at simulating movement. It uses a towing system powered by an electric motor and moves the decoys as needed. Although the movement of the decoys may simulate the wallowing behavior of live waterfowls, it does so using a very complicated and costly device.

U.S. Pat. No. 6,625,919 issued to Davis on 30 Sep. 2003 entitled Duck Decoy with Landing Motion is a more recent attempt at simulating water movement of waterfowls by using a spring arm system that is land based. Like its prior arts, it is overly complicated, expensive, and may have negative effects of scaring away birds.

While the above patents may fulfill their respective objectives, these patents fail to properly address the specific issue of simulating water movement engaged with the wallowing behavior of live waterfowls like that of the present invention. Therefore, it is clear that the need for a economic and simple way to bring waterfowl decoys to life by simulating the rippling effects of wallowing and moving waterfowls on the surface of the water still persists.

SUMMARY OF THE DESCRIPTION

In accordance with one embodiment of a waterfowl decoy apparatus comprising of a replica decoy and a flexible member, wherein the flexible member may be transparent and is shaped to form undulating curvatures consisting of crests and troughs emanating from the interior following an outward orbital path. The flexible member may include a circular hollow portion at its interior or center upon where the decoy may be placed. The means to connect the replica decoy to the flexible member can be any means known in the art or the replica need not be connected to the flexible member but can simply float inside the circular hollow portion. The replica decoy can be any decoy known in the art.

The transparent flexible member may have a generally elliptical or teardrop exterior configuration and varies in size dependent on the size of the decoy. The different exterior shapes of the flexible member are dependant on what the hunter wants to simulate. Generally the elliptical shaped flexible member is meant to emulate the rippling affect of water made by a stationary waterfowl. The flexible members with a general teardrop configuration may be used to emulate the v-pattern rippling effect of water made by a moving waterfowl.

BRIEF DESCRIPTION OF THE DRAWINGS

The above description and other objects, advantages, and features of the present invention will be more fully understood and appreciated by reference to the specification and accompanying drawings, wherein.

DETAILED DISCUSSION OF THE PREFERRED EMBODIMENTS

Figure 1:
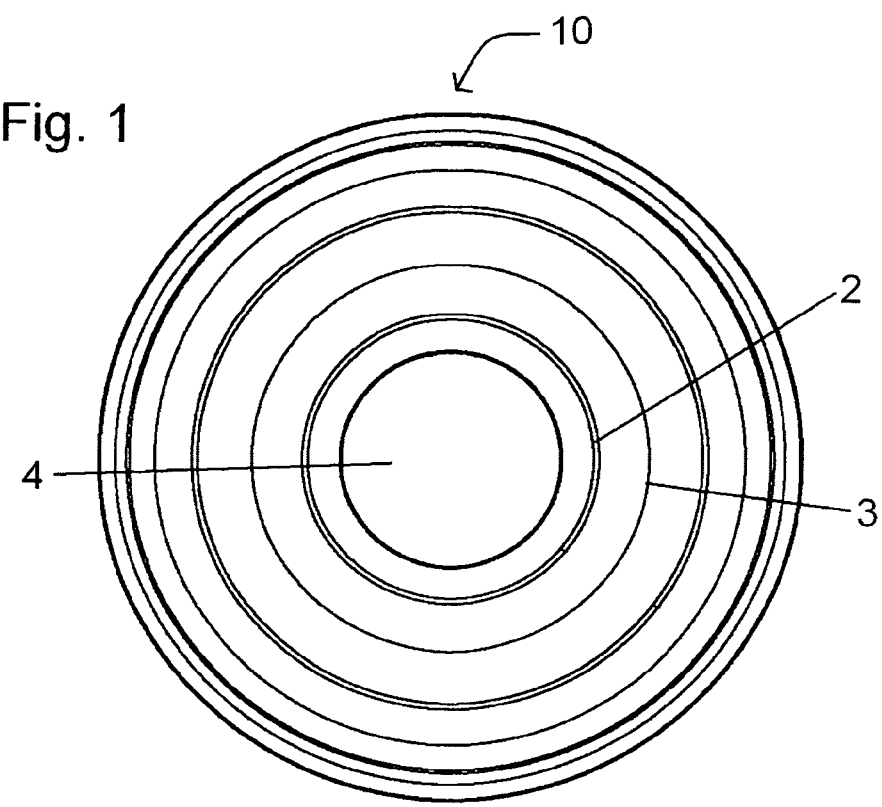
FIG. 1 is an elevation view of the invention.

FIG. 1 shows the preferred embodiment 10 comprising of a transparent flexible member with undulating curves. The member may be any suitable plastic or similar material with sufficient flexibility and strength but remain substantially thin to be unobtrusive.

The embodiment is generally an elliptical shape with a circular hollow portion at its interior 4.

It should be noted that while an elliptical configuration, which includes oval and circular shapes, is the preferred shape of the embodiment, this invention also contemplates other geometric configurations; particularly, in instances where the water movement being simulated is irregular.

Figure 2:
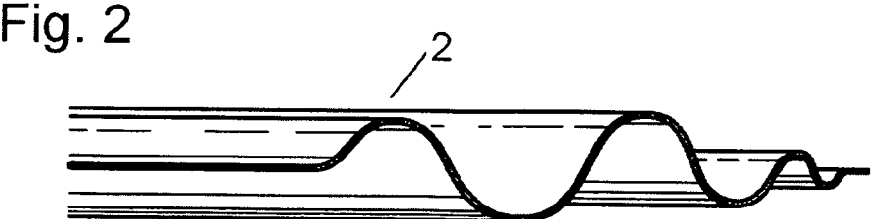
FIG. 2 is a side view of the decoy.
Figure 3:
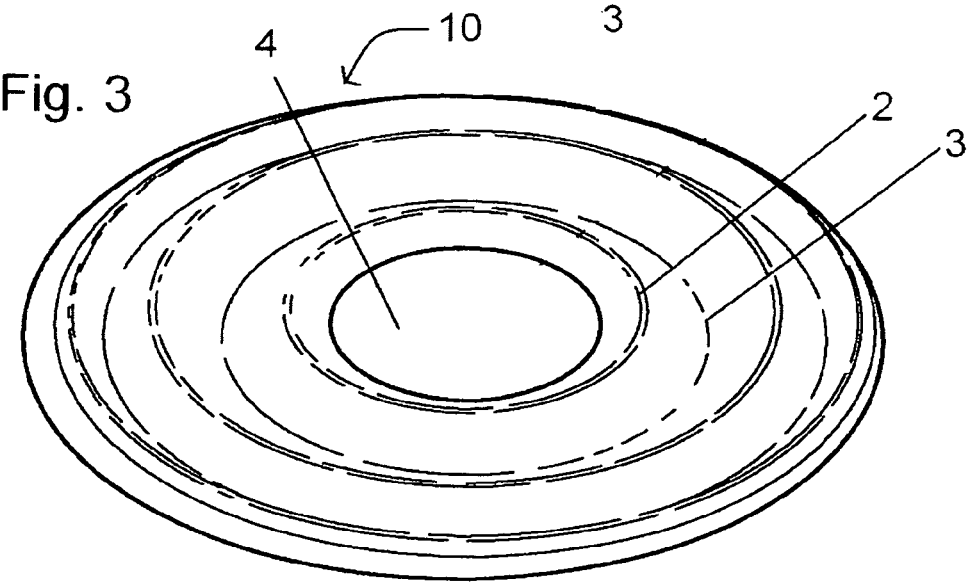
FIG. 3 is a side elevation view of the decoy.

FIG. 2 shows the side view of the preferred embodiment; the curvatures consist of the crests 2 and troughs 3 emanating from its interior 4 following an outwardly orbital path. The frequency, size and shape of the curvatures of the member are understood to correspond to the natural movement of water as it engages with the movements of a wallowing live waterfowl.

The preferred embodiment 10 is made of clear plastic or other suitable material, neutrally buoyant which should be sufficient in flexibility and size. Thickness of the member 10 is preferably 0.3 mm.

Figure 4:
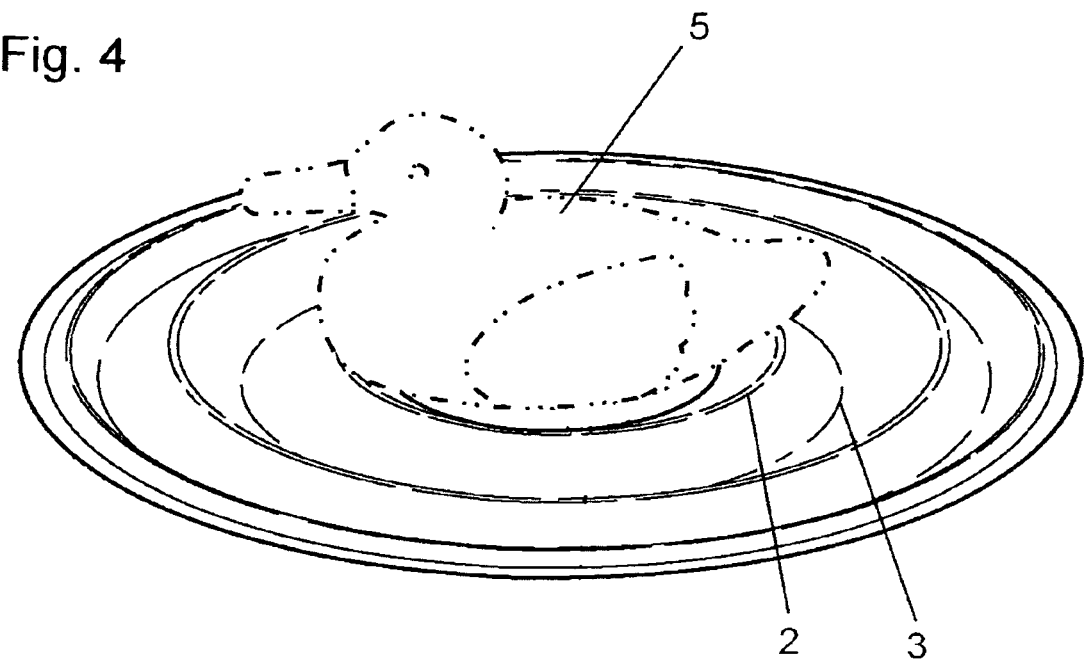
FIG. 4 is a side elevation view of the decoy with an outline of replica decoy as it appears in its deployed position.

FIG. 4 is a side elevation view of the decoy with an outline of a replica decoy as it appears in its deployed position. While the embodiment may be deployed by itself to attract waterfowl; it is specifically designed to be used in conjunction with waterfowl replica decoy 5.

Figure 6:
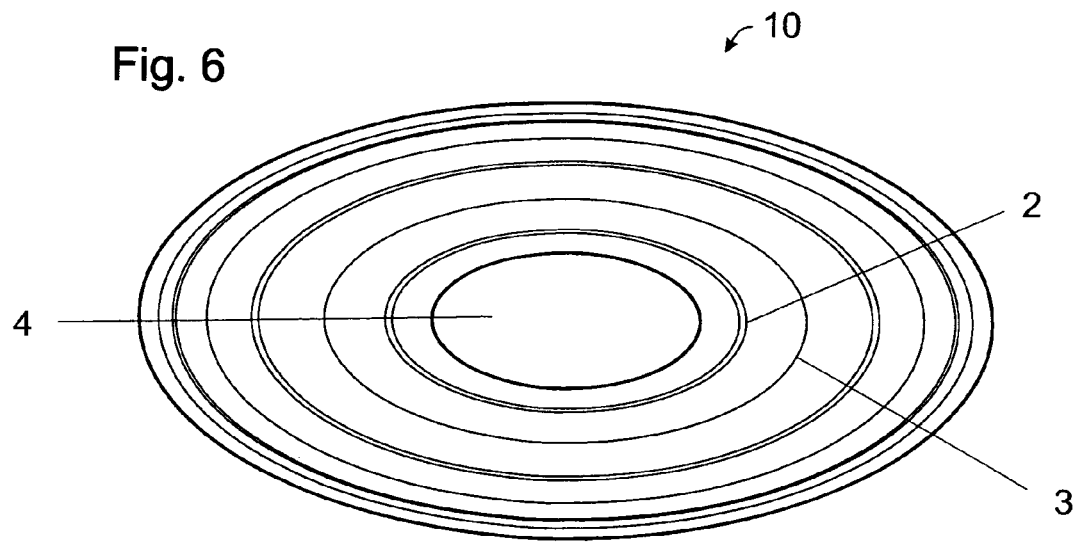
FIG. 6 is a elevation view of the invention in the oval shape.

In one embodiment, the undulating orbital curvatures have a generally elliptical shape which includes any circular or oval shaped configuration representative of water ripples created by a wallowing waterfowl in a more or less stationary position. This embodiment can be seen in FIG. 6.

Figure 5:
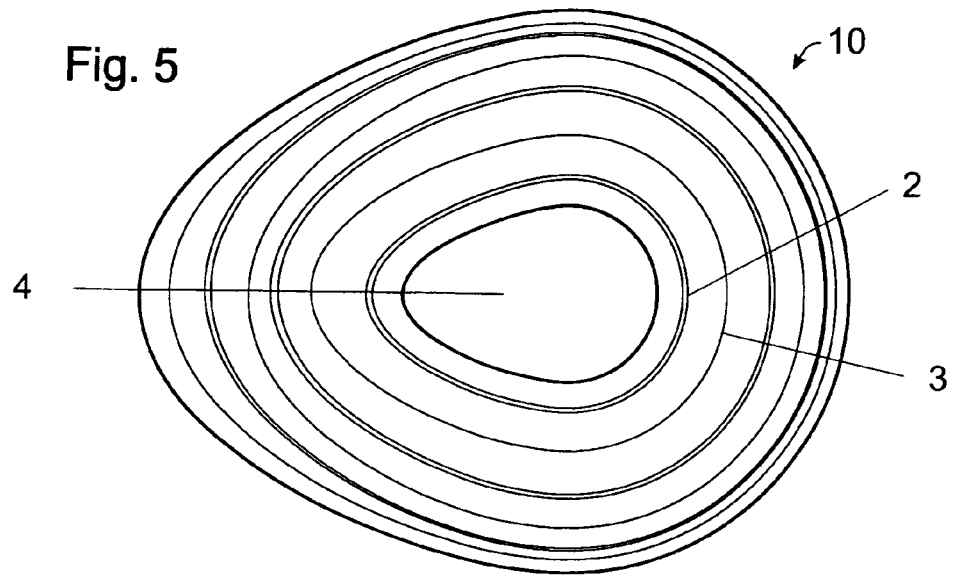
FIG. 5 is an elevation view of the invention in a teardrop shape.

In another embodiment, the undulating orbital curvatures have generally teardrop configuration representative of v-patterned water ripples created by a waterfowl in a moving position. This embodiment can be seen in FIG. 5.

The benefits of the disclosed embodiments allow for a simple and economic way of improving ordinary decoys. It simulates the waves and ripples caused by live ducks without using complicated systems, and can be transported and implemented with ease.

Throughout the specification the aim has been to describe the invention without limiting the invention to any one embodiment or specific collection of features. Persons skilled in the relevant art may realize variations from the specific embodiment that will nonetheless fall within the scope of the invention. For example, the flexible member need not be completely transparent. The size and shape of the flexible member can be anything suitable to simulate the wave and ripples of wallowing ducks. The flexible member can be made of any material known in the art. The thickness of the flexible member need not be limited to the preferred embodiment. The circular hollow portion at the interior of the flexible member need not be limited to a shape or size, and may even be excluded. The means of attaching the decoy to the flexible member can be any means know in the art.

Accordingly, the scope of the invention should be determined not by the embodiment illustrated, but by the appended claims and their legal equivalents.

I claim:

1. A decoy apparatus used on top a body of water to simulate ripples comprising:
   a replica waterfowl decoy;
   a flexible member having an open central portion at its interior, wherein said flexible member is shaped to form undulating curvatures consisting of crests and troughs emanating from said open central portion forming an outward orbital path concentric about said open central portion;
   said flexible member comprises of an exterior shape; and
   wherein said flexible member is buoyant; and
   wherein said replica waterfowl decoy is disposed on said flexible member in said open central portion of said flexible member.

2. A decoy apparatus as in claim 1, wherein said exterior shape of said flexible member is generally an elliptical configuration.

3. A decoy apparatus as in claim 1, wherein said exterior shape of said flexible member is generally a circular configuration.

4. A decoy apparatus as in claim 1, wherein said flexible member is made from a substantially transparent material.

5. A decoy apparatus as in claim 1, wherein said flexible member is made of clear plastic.

* * * * *